United States Patent
Schmid et al.

(12) 
(10) Patent No.: US 6,205,838 B1
(45) Date of Patent: Mar. 27, 2001

(54) DEVICE FOR DETERMINING THE ROTATIONAL SPEED

(75) Inventors: Eberhard Schmid, Reutlingen; Siegbert Steinlechner, Leonberg; Johannes Artznei, Reutlingen; Reinhard Neul, Stuttgart, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/091,913
(22) PCT Filed: Oct. 2, 1997
(86) PCT No.: PCT/DE97/02266
   § 371 Date: Aug. 19, 1999
   § 102(e) Date: Aug. 19, 1999
(87) PCT Pub. No.: WO98/27403
   PCT Pub. Date: Jun. 25, 1998

(30) Foreign Application Priority Data

Dec. 19, 1996 (DE) .............................. 196 53 020

(51) Int. Cl.⁷ .................................... G01P 21/00
(52) U.S. Cl. ......................... 73/1.37; 73/504.13
(58) Field of Search .................... 73/1.37, 1.77, 73/504.13, 504.12, 504.14, 504.15, 504.16, 511, 514.16

(56) References Cited

U.S. PATENT DOCUMENTS 5,426,970 * 6/1995 Florida et al. ................... 73/1.37
5,889,193 * 3/1999 Pfaff et al. ...................... 73/1.37

FOREIGN PATENT DOCUMENTS

WO 96/21138  12/1994 (WO).

* cited by examiner

Primary Examiner—Helen C. Kwok
(74) Attorney, Agent, or Firm—Michael J. Striker

(57) ABSTRACT

A device for determining a rotation rate is described, in which by means of digital evaluation circuits the output signals of a rotation rate sensor are evaluated. By identification of the transfer function from the electronically generated oscillation voltage that excites the oscillating body carrying the acceleration elements, to the output of the acceleration elements, or by identification of the transfer function from the electrically generated test voltage at the input of the acceleration elements to their output, the systematic errors of the rotation rate sensor are determined and taken into account in the digital sensor signal processing, with the aid of which the rotation rate is unequivocally determined.

13 Claims, 2 Drawing Sheets

DEVICE FOR DETERMINING THE ROTATIONAL SPEED

BACKGROUND OF THE INVENTION

The invention is based on a device for determining a rate rotation.

The use of rotation rate sensors that utilize the Coriolis effect is known in conjunction with systems for dynamic control in motor vehicles. Such rotation rate sensors typically comprise one or more masses that are set into mechanical oscillation at the frequency $f_s$ by an electrical oscillator circuit. These mechanical oscillations act on one or more acceleration sensors, which upon a rotation of the system also measure the Coriolis acceleration acting on the oscillating masses. From the excitation and acceleration signals, the rotation rate of the system can be determined with the aid of a suitable evaluation circuit.

An additional electrical test signal that is fed to the acceleration sensor or acceleration sensors can be used to cause an additional, arbitrarily generated acceleration to act upon the sensor. In this way, information on the properties of the acceleration sensor and the downstream evaluation circuits can for instance be obtained. It is thus also possible to detect errors, and especially systematic errors. This is especially important because rotation rate sensors that evaluate the Coriolis effect has systematic errors, whose effect on the measurement signal must be minimized by a suitable choice of evaluation method. Such systematic errors can be classified in one of the following types of error:

a) The acceleration sensor or sensors are sensitive not merely in the direction of the Coriolis acceleration to be measured but in other directions as well.

b) The mechanical oscillator that is set into oscillation by the electrical circuit has unintended oscillation components in the direction of the Coriolis acceleration.

c) Electrical feedthrough of the oscillation signal to the acceleration signal is possible.

To evaluate the output signals of rotation rate sensors, until now circuits have been used that are designed as analog circuits for signal processing. Such evaluation circuits, with which the rotation rate can be determined from the output signals of a rotation rate sensor and with which moreover monitoring the operability of the sensor or of the evaluation circuit is made possible, are described in International Patent Application WO 96/21138.

The known device for determining a rotation rate includes a rotation rate sensor which operates on the principle of a resonant oscillation gyrometer and is excited by means of an amplitude-regulated oscillator loop. This sensor is used for instance to ascertain the yaw speed of a vehicle. To that end, the effect of the Coriolis acceleration, which is a measure for the actual yaw speed, is evaluated. To monitor the operability of the sensor or of the associated electronics, an additional voltage, for instance in the form of a Bite function, is fed in at certain selectable times, and the reaction of the system to this additional voltage is evaluated for error detection.

SUMMARY OF THE INVENTION

Accordingly, it is an object of the present invention to provide a device for determining a rate rotation which avoids the disadvantages of the prior art.

In keeping with these objects, one feature of present invention resides, briefly stated, in a device for determining a rotation rate, in which the oscillation voltage which is proportional to the instantaneous speed of the oscillatable body is picked up and digitized, the output voltage is digitized or is already generated as a digital signal, and from two digitally presented voltages, the transfer function is formed, which simulates all interference components at the rotation rate of zero and is the point of departure for determination of the rotation rate.

The device of the invention has the advantage over the known device that purely digital signal processing is done, while in the known device an analog circuit is employed. The use of adaptive methods of digital signal processing enables advantageous system identification and a system simulation. Sensor errors can be compensated for successfully by the adaptation processes. The digital evaluation circuit according to the invention is advantageously fully integratable and has no problems of synchronism and drift of the individual components. The circuit is calibration-free, except for a scaling factor.

These advantages are attained in that both the oscillation voltage and the electrical acceleration signal are evaluated jointly, with digitizing of the signals being done beforehand. In a first evaluation method, the digitized signals are subjected to an adaptive system identification, as a result of which the transfer function of the sensor system between the oscillation signal and the acceleration signal is simulated. With the aid of this transfer function, the rotation rate can be determined. In this method, all the relevant factors are simulated by means of the system identification. However, constant rotation rates that persist for a long time are compensated for.

In a second method, in which in addition a test signal $U_T$ that excites the acceleration sensors is used, even long-persisting constant rotation rates are ascertained, even though at the same time a fast adaptation rate is possible. In this method, a system identification of the transfer function between the test signal $U_T$ and the acceleration signal $U_2$ is performed, and with the aid of this the rotation rate is determined. By using the test signal, malfunctions of the sensor or of the associated digital evaluation circuit can advantageously be detected as well.

BRIEF DESCRIPTION OF THE DRAWING

Exemplary embodiments of the invention are shown in the drawing and will be described in further detail below. Specifically.

DESCRIPTION OF THE PREFERRED EMBODIMENTS

Figure 1:
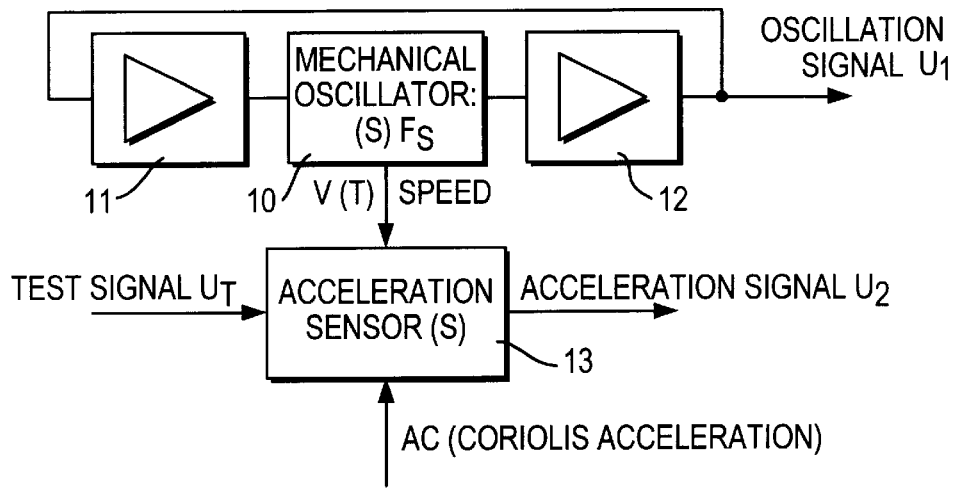
FIG. 1 shows a block circuit diagram of a rotation rate sensor.

In the block circuit diagram shown in FIG. 1 of a rotation rate sensor, the mechanical oscillator, such as a hollow cylinder fastened at one end, is identified by reference numeral 10. This oscillator is set into mechanical oscillation by an electric circuit. The electric circuit includes the two amplifiers 11 and 12. Amplifier 11 is regulated amplifier or has limiter properties. The associated output signal is designated as an oscillation signal $U_1$.

The mechanical oscillator 10 that is excited to oscillate at the frequency $f_s$ influences the acceleration sensor 13, or optionally the acceleration sensors, which are secured to the mechanical oscillator 10. In the block circuit diagram of FIG. 1, this influence is represented as a speed v(t). The acceleration sensor 13 or acceleration sensors are also influenced by the Coriolis acceleration ac.

In addition, a test signal $U_T$ can be supplied, which causes an additional arbitrarily acceleration to act on the acceleration sensor 13. At the output of the acceleration sensor 13, a voltage is established which is called the output voltage $U_2$ and which represents the actual acceleration signal.

Figure 2:
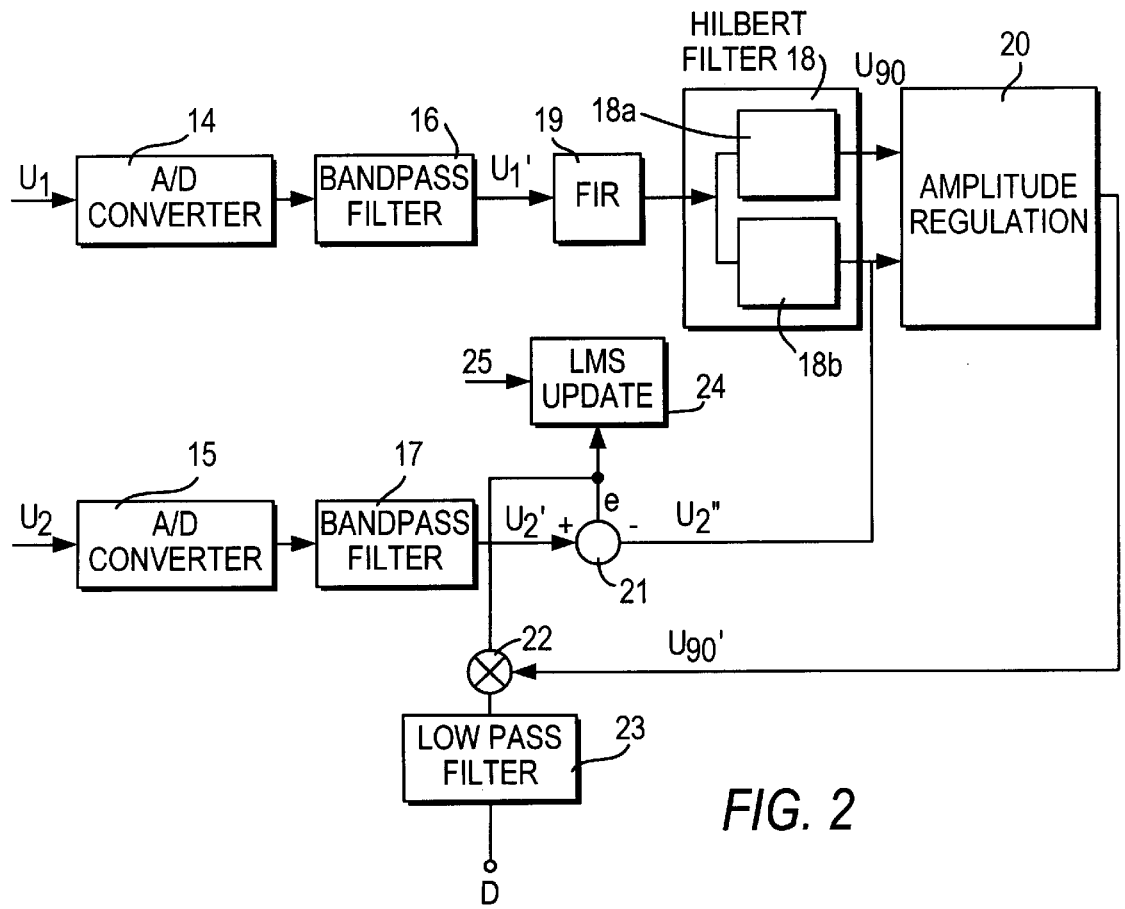
FIG. 2 shows a first evaluation circuit.
Figure 3:
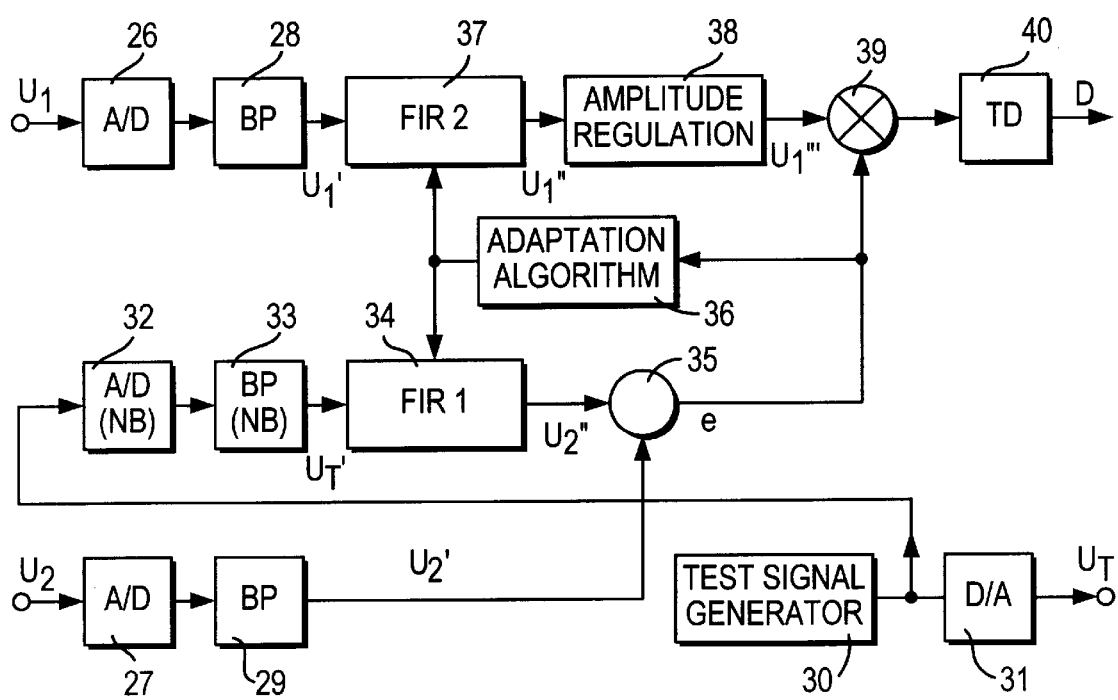
FIG. 3 shows a second evaluation circuit for the output signals of a rotation rate sensor of FIG. 1.

From the oscillation voltage $U_1$ and the output voltage $U_2$, the rotation rate D can be ascertained, using the digital evaluation circuits shown in FIGS. 2 and 3. The circuit shown in FIG. 2 thus makes it possible to determine the rotation rate D of the system from excitation and acceleration signals. The circuit shown in FIG. 3 additionally uses a test signal $U_T$.

In FIG. 2, a first evaluation circuit is shown, with which the voltages $U_1$ and $U_2$ are evaluated. To that end, the oscillation voltage $U_1(t)$, which is proportional to the instantaneous speed $v(t)$ of the mechanical oscillation, and the electrical acceleration signal, that is, the output voltage $U_2(t)$, are each converted into digital signals in a respective analog/digital converter 14, 15. Optionally, the output signal $U_2$ of the acceleration sensor is also already present in digital form, which is especially true if the acceleration information has already been obtained digitally with the aid of a so-called sigma-delta process.

The digitized signals are each filtered using identical bandpass filters 16, 17, whose mean frequency is in the vicinity of the mechanical oscillation frequency $f_s$. After this, an adaptive system identification is performed, which for instance proceeds using an LMS or RLS algorithm, which simulates the transfer function $H_{Nb12}(z)$ of the sensor system between the oscillation signal $U_1(z)$ and the acceleration signal $U_2(z)$. In other words, the following equation applies:

$$U_2(z) = H_{Nb12}(Z) * U_1(z)$$

The transfer function $H_{nb12}(z)$ simulates all the interfering components that occur at the rotation rate 0 and that have the oscillation frequency $f_s$. If it is assumed that the essential interfering component has a phase displacement of 90° with regard to the speed v and thus to the Coriolis acceleration ac, then the evaluation described below can be performed. To that end, a branch of a digital 90° Hilbert filter 18 is included in the system identification. This Hilbert filter 18 is supplied with the output voltage of the bandpass filter 16 via an FIR filter 19. The Hilbert filter 18 has not only the branch 18b, which is included in the system identification, but also a branch 18a, whose voltage has a phase displacement of 90° from the first branch 18b. The output signal of the second branch $U_{90}$ is regulated in its amplitude in the amplitude regulation 20.

There are two variants for performing the amplitude regulation. In the first variant, the voltage $U_{90}'$ is regulated to constant amplitude; that is:

$$(U_9')_{ss} = \text{const.}$$

This type of regulation is appropriate for a constant amplitude of the speed V or a constant amplitude of the voltage $U_1$.

In the second variant of amplitude regulation, the voltage $U_{90}'$ is regulated such that the amplitude of the voltage $U_{90}$ multiplied by the amplitude of the voltage $U_1$ is constant; that is:

$$(U_{90}')_{ss} * (U_1)_{ss} = \text{const.}$$

This type of regulation is appropriate with a variable amplitude of the speed v or a variable amplitude of the voltage $U_1$.

The analog/digitally converted and bandpass filtered acceleration signal $U_2'$, which occurs at the output of the bandpass filter 17, like the signal $U_2''$ occurring at the output of the Hilbert filter 18, is supplied to a summation point 21. At the summation point 21, the simulated interference signal $U_2''$ is subtracted from the acceleration signal $U_2'$. The resultant signal e represents the cleaned acceleration signal, which is demodulated by multiplication with the standardized signal $U_{90}'$. The demodulation is identified in FIG. 2 as point 22. In the following low-pass filter, the demodulated signal is freed of the double oscillation frequency $2f_s$ occurring in the multiplication, and the noise bandwidth is reduced. At the output of the low-pass filter 23, a signal occurs that is equivalent to the rotation rate D.

The signal e is also used as an error signal for controlling the adaptation. The adaptation process must therefore proceed very slowly, for instance over the range of minutes, because otherwise rotation rates that are constant over a longer period would be compensated out of existence. The adaptation speed can advantageously be controlled from outside with the aid of additional information, such as "sensor in repose". Hence a fast adaptation in repose and a slow adaptation during normal operation can be achieved. In FIG. 2, the adaptation processes are combined in one block 24, to which the additional information can be supplied via an input 25. The adaptation stage influences the filter stage 19 via suitable connections.

In FIG. 3, a further digital evaluation circuit is shown, which permits signal evaluation by a second method. In this evaluation circuit, the oscillation voltage $U_1$ and the acceleration voltage $U_2$ are in turn supplied first to a respective analog/digital converter 26, 27 and to a respective bandpass filter 28, 29. The voltages $U_1'$ and $U_2'$ then appear at the outputs of the bandpass filters 28, 29.

In addition, with the aid of a test signal generator 30, a test signal $U_{TD}$ is generated, which has frequency components in the vicinity of the oscillation frequency of the mechanical oscillator and may for instance be sinusoidal or rectangular in shape. A so-called pseudo binary noise (PRBS, PN sequence) is suitable as a test signal as well. This test signal is converted in a digital/analog converter 31 and delivered in the form of the voltage $U_T$ to the acceleration sensor, as shown in FIG. 1.

The transfer function $H_{NbT2}(z)$ from the input $U_T$ to the output $U_2$ of FIG. 1 is also identified and simulated. To that end, first the changes that the signal $U_2$ undergoes along the signal path to $U_2'$ are digitally simulated for the digitally present test signal. This modeling is done with the aid of the analog/digital converter simulation 32 and the bandpass filter simulation 33. Thus the voltage $U_T'$ appears at the output of the bandpass simulation 33.

If a sinusoidal test signal is used as the test signal, then a corresponding phase displacement suffices for the simulation. The simulation of the transfer function $H_{NbT2}(z)$ is done via an adaptive FIR filter 34. The following equation applies:

$$U_2''(Z) = U_T'(Z) * H_{NbT2}(Z)$$

The voltage $U_2''$ simulates the analog/digitally converted and bandpass-filtered acceleration voltage. At the summation point 34, it is subtracted from the actual acceleration voltage $U_2'$, thus creating the error signal e, which controls the adaptation algorithm, which is shown as a block 36. The signal e, once adaptation is established, no longer includes any test signal components but instead now contains all the signal components that are caused by the mechanical rotation rate D to be measured.

The analog/digitally converted and bandpass filtered oscillation voltage $U_1'$ is filtered using a second FIR filter 37, whose coefficients are a copy of the coefficients of the filter 34. The signal $U_1''$ thus obtained is suitable, because of its phase relationship, for the demodulation of the rotation rate sensor signal contained in the signal e. However, beforehand the voltage $U_2''$ must be standardized, as described for the first method. To that end, it is delivered to an amplitude regulation 38, at whose output the voltage $U_1'''$ appears, which at point 39 is multiplied by the signal e. After multiplication of the voltage $U_2'''$ by the signal e and ensuing low-pass filtration in the low-pass filter 40, and after the digital/analog conversion in the digital/analog converter 41, the rotation rate signal D is obtained.

What is claimed is:

1. A device for determining a rotation rate, having an oscillatable body, which is set into constant oscillation by means of an oscillation voltage ($U_1$) generated in an electrical circuit, having at least one sensor element which is disposed on the oscillatable body and outputs an output voltage ($U_2$), which is a measure for a acceleration and thus also for the rotation rate, characterized in that the oscillation voltage ($U_1$), which is proportional to an instantaneous speed v(t) of the oscillatable body, is picked up and digitized; that the output voltage ($U_2$) is digitized or is already generated as a digital signal; and that from two digitally present voltages ($U_1$, $U_2$) a transfer function is formed, which simulates all interference components at the rotation rate of zero and is the point of departure for the determination of the rotation rate.

2. The device for determining a rotation rate of claim 1, characterized in that a prepared oscillation voltage ($U_1$) is delivered via an FIR filter (19) to a Hilbert filter (18) having one branch which furnishes an output voltage ($U_2''$), which corresponds to a simulated interference signal that is subtracted at a summation point (21) from a digitized and bandpass-filtered voltage ($U_2'$), for forming an error signal e, which is multiplied by an amplitude-regulated signal obtained from the second branch of the Hilbert filter, and which, after filtration in a low-pass filter (23), furnishes the rotation rate.

3. The device for determining a rotation rate of claim 2, characterized in that coefficients of the FIR filter (19) are set via an adaptation (24) which is controlled by the error signal e, as a result of which the properties of the FIR filter (19) are adapted to requirements.

4. A device for determining a rotation rate, having an oscillatable body, which is set into constant oscillation by means of an oscillation voltage ($U_1$) generated in an electrical circuit, having at least one sensor element which is disposed on the oscillatable body and outputs an output voltage ($U_2$), which is a measure for an acceleration and thus also for the rotation rate, characterized in that the oscillation voltage ($U_1$), which is proportional to an instantaneous speed v(t) of the oscillatable body, is picked up and digitized; that the output voltage ($U_2$) is digitized or is already generated as a digital signal; and that in addition a test signal ($U_T$) is generated, which has frequency components in the vicinity of an oscillation frequency of a mechanical oscillator and is additionally delivered to an acceleration sensor; that the changes caused by the test signal are digitally simulated, and this simulation is subtracted from an actual acceleration voltage.

5. The device for determining a rotation rate of claim 4, characterized in that the transfer function from the test signal ($U_T$) to the output voltage ($U_2$) is identified and simulated and taken into account in determining the rotation rate.

6. The device for determining a rotation rate of claim 5, characterized in that a digitized and bandpass-filtered voltages ($U_1'$) and ($U_T'$) are each delivered to a respective adaptive FIR filter (34, 37), and a adaptation is effected as a function of an digitized and bandpass-filtered acceleration voltage ($U_2''$) and the actual acceleration voltage ($U_2'$).

7. The device for determining a rotation rate of claim 6, characterized in that the coefficients of identical FIR filters (34 and 37) are set, via an adaptation algorithm (36) that is controlled by an error signal e, in such a way that the FIR filters simulate the transfer function from the test signal ($U_T$) to the output voltage ($U_2$).

8. The device for determining a rotation rate of claim 7, characterized in that a digitized and filtered oscillation signal ($U_1''$) is regulated in amplitude, and that after the multiplication of a regulated oscillation signal ($U_1'''$) by the error signal e and low-pass filtration in a low-pass filter (40), a the rotation rate signal (D) occurs.

9. The device for determining a rotation rate of claim 1, characterized in that an amplitude regulation (20) or (38) regulates to a constant amplitude of a voltage ($U_{90}'$) or of the voltage ($U_1'''$).

10. The device for determining a rotation rate of claim 1, characterized in that an amplitude regulation (20) or (38) regulates to an amplitude that is proportional to the inverse of the amplitude of the oscillation voltage ($U_1$).

11. The device for determining a rotation rate of claim 1, characterized in that a low-pass filter is present at an output of an evaluation circuit, and said low-pass filter filters out the higher-frequency signal components, having twice the oscillation frequency.

12. The device for determining a rotation rate of claim 1, characterized in that a speed of adaptation of FIR filters is adaptable from outside.

13. The device for determining a rotation rate of claim 1, characterized in that a digital evaluation circuit is embodied as a fully integratable circuit.

* * * * *